United States Patent
Ansel et al.

(10) Patent No.: US 8,027,254 B2
(45) Date of Patent: Sep. 27, 2011

(54) METHOD OF LIMITING BIT RATE IN A TELECOMMUNICATIONS NETWORK

(75) Inventors: Pierre Ansel, Clamart (FR); Hervé Sibert, Le Mans (FR); Roderick Asselineau, Bures-sur-Yvette (FR); Pascal Marty, Vanves (FR)

(73) Assignee: France Telecom, Paris (FR)

( * ) Notice: Subject to any disclaimer, the term of this patent is extended or adjusted under 35 U.S.C. 154(b) by 707 days.

(21) Appl. No.: 11/893,718

(22) Filed: Aug. 16, 2007

(65) Prior Publication Data
US 2008/0130499 A1 Jun. 5, 2008

(30) Foreign Application Priority Data
Aug. 16, 2006 (FR) ...................................... 06 53378

(51) Int. Cl.
*H04L 12/26* (2006.01)
(52) U.S. Cl. .................................................. 370/230.1
(58) Field of Classification Search .................. None
See application file for complete search history.

(56) References Cited

U.S. PATENT DOCUMENTS

| | | | |
|---|---|---|---|
| 5,274,644 A | 12/1993 | Berger et al. | |
| 5,596,576 A | 1/1997 | Milito | |
| 6,445,679 B1 * | 9/2002 | Taniguchi et al. | 370/232 |
| 6,798,741 B2 * | 9/2004 | Lodha et al. | 370/229 |
| 7,027,393 B1 * | 4/2006 | Cheriton | 370/230.1 |
| 2004/0120252 A1 | 6/2004 | Bowen et al. | |
| 2005/0195840 A1 * | 9/2005 | Krapp et al. | 370/401 |
| 2007/0030819 A1 * | 2/2007 | Bichot et al. | 370/315 |
| 2007/0153697 A1 * | 7/2007 | Kwan et al. | 370/235 |
| 2008/0117930 A1 * | 5/2008 | Chakareski et al. | 370/465 |

* cited by examiner

*Primary Examiner* — Anh-Vu Ly
(74) *Attorney, Agent, or Firm* — Cozen O'Connor

(57) ABSTRACT

A method of limiting the bit rate going to a network service having a target bit rate, data packet traffic to the service coming from at least one contributor, and a bit rate being associated with the portion of the traffic coming from said contributor. The method includes sending the packet from the contributor to the service if the bit rate of the traffic of the contributor is below a threshold that is a function of the target bit rate and a current data packet traffic to said service, the bit rate of the traffic from the contributor being measured on the current data packet traffic.

21 Claims, 6 Drawing Sheets

METHOD OF LIMITING BIT RATE IN A TELECOMMUNICATIONS NETWORK

FIELD OF THE INVENTION

The field of the invention is that of telecommunications networks. To be more precise, the invention relates to a technique for limiting the bit rate in a network.

BACKGROUND OF THE INVENTION

The invention finds one particularly beneficial application in protecting network services experiencing excessively high bit rates caused by traffic peaks or denial of service attacks.

Providing services and specifying a certain quality of service in a packet network, for example an IP network, is known in the art. The quality of service is expressed by a maximum authorized bit rate or bandwidth, for example.

Various mechanisms are used to monitor the volume of incoming traffic and to manage and adapt the bandwidth. These techniques include the rate limiting technique that monitors the volume of traffic going to a service and the bit rate at which it is transmitted in order to comply with the limit on traffic going to the service. Existing rate limiting algorithms are based on using packet queues.

A first known rate limiting algorithm is the leaky bucket algorithm for regulating traffic arriving at a queue in order to output a fixed flow to the network. The algorithm monitors the transmission time intervals of the packets so that the effective bit rate of packets sent to the service over the network complies with the specified target bit rate. Thus if the packets sent to the service are large, the time intervals between packets are increased, to comply with an average bit rate compatible with the target bit rate. The average bit rate is calculated as a weighted average of the bit rates obtained while sending the last N packets and while waiting between two transmissions. This algorithm is very suitable for sending fixed bit rates over the network, but it does not enable more resources to be used when the network is relatively lightly loaded.

A second known rate limiting algorithm is the token bucket algorithm that uses tokens corresponding to authorizations to send a certain volume of data to a service over the network. The algorithm regularly fills a token queue. If the target bit rate is 1 Mbyte/s and a token corresponds to a right to transmit over the network at 1 kbyte/s, the queue is filled with tokens at the rate of 1000 tokens per second. In parallel with this, the algorithm uses a second queue for packets to be sent. A packet of size S is sent over the network if there are sufficient tokens of size J in the token queue to transmit S bytes over the network. For the packet to be sent it is therefore necessary for there to be at least N tokens in the token queue, where N=S/J. This mechanism enables traffic to be sent so long as there are tokens in the queue, which may have accumulated when the network was relatively lightly loaded. That mechanism is therefore suitable for managing traffic peaks.

The above algorithms process a flow or a type of flow to the service. If the queues reach saturation point, packets are discarded, wherever they originate. Thus those algorithms do not offer a sufficiently refined level of processing to discriminate different types of contributors, namely small contributors using the bandwidth within acceptable limits and large contributors exceeding the acceptable limits.

The published US application 2006/0036720 discloses a rate limiting method applied to instances of events of certain types. One example of an event type is a DNS (domain name service) protocol message, and one example of an instance of that type of event is the identifier of the source that sent a message of that type. Rate limiting then consists in taking action (for example discarding the message) if the number of instances of events exceeds a predefined threshold. The method can therefore limit traffic coming from a contributor. However, the threshold that triggers rate limiting is fixed a priori. Thus the method cannot adapt rate limitation as a function of the actual use of the bandwidth. In fact, with the method described, if a contributor sends traffic to the service with a bit rate above the set threshold, the contributor's traffic will be rejected even though the bit rate of the traffic may comply with the target bit rate for the service, especially if no other contributor is sending traffic to the service at the same time.

There is therefore a requirement for a mechanism to limit traffic going to a network service in compliance with the target bit rate for the service, the mechanism giving small contributors to the service preference over large contributors by defining and applying a threshold between small contributors, whose traffic is authorized and forwarded to the service, and large contributors, whose traffic is rejected, which threshold can evolve according to the current actual traffic to the service.

SUMMARY OF THE INVENTION

One object of the present invention is directed to a method of limiting the bit rate going to a network service having a target bit rate ($D^M$), data packet traffic to the service coming from at least one contributor and a bit rate being associated with the portion of the traffic coming from said contributor. The method includes sending the packet from the contributor to the service if the bit rate of the traffic of the contributor is below a threshold ($L_n$) that is a function of the target bit rate and a current data packet traffic to said service, the bit rate of the traffic from the contributor being measured on the current data packet traffic.

This rate limiting method can advantageously prioritize small contributors, whose current traffic bit rate is below the threshold, over large contributors, whose current traffic bit rate is above the threshold, whilst complying with a target bit rate limit for a network service. Thus access to the service for a contributor classified as small is maintained, even if contributors classified as large are attempting to access the service. Packets emanating from large contributors are rejected. Thus a level of quality of service is maintained over time for small contributors. Moreover, the threshold is computed from the total current traffic to the service. It is therefore a function of the actual use of the service at the time it is compared with a contributor bit rate. The method is such that the total sum of the bit rates of authorized small contributors is close to the target bit rate accepted by the service, in order to allow the traffic from the greatest possible number of small contributors to pass without exceeding the acceptable limit for the service. The method therefore optimizes the use of the bandwidth of the service.

Another advantage of this method is that it contributes to the fight against denial of service attacks that originate from a single contributor or from various contributors usurping the same source address. Such an attack is therefore reflected in the presence of a large contributor to the service.

According to one feature of the invention, once the threshold ($L_n$) has been computed at a first time, a second time at which the threshold will be recomputed is evaluated on receiving each packet.

In evaluating the time at which the threshold is to be recomputed, account is advantageously taken of each of the packets and therefore of the evolution of the traffic to the service in real time. Any evolution in the bit rate of the current traffic is therefore taken into account immediately. Thus during successive evaluations of the time for recomputing the threshold, the threshold may be recomputed often, for example if many new contributors are sending traffic to the service, or in contrast, no recomputation of the threshold may be necessary for a long period, for example if the number of contributors and the volume of traffic that they send to the service do not change very much, this volume remaining within the limit set by the target bit rate for the service. It is therefore possible to adapt quickly to evolution of traffic, by causing the threshold to evolve, and to maintain normal operation without unnecessary threshold computation.

According to particular features of the invention, with a variable time period ($T_R$) for computation of the threshold being defined by the first and second threshold computation times, said variable time period lies in the range from a minimum value ($T^0$) for current data packet traffic determination to a predetermined maximum value ($T_R^{max}$).

It is judicious to select a threshold computation time period greater than a minimum value that corresponds to the duration of a time window used to evaluate the current traffic going to the service and the bit rate of the traffic of one user. This is because, when a new threshold between small and larger contributors is fixed, all contributors encountered in the time window must be reclassified as large or small contributors. An unsatisfactory solution would be to work through the contributors in the window and reclassify them, which would lead to a computation overload on each threshold redefinition. The solution used by the invention is to reclassify the contributors in the window when they leave it or enter it as the window slides on each arrival of a new packet. Thus when the threshold between small and large contributors is redefined, it is necessary to wait at least for a time period corresponding to the chosen duration of the time window before computing a new threshold.

Thus at the time of a threshold recomputation, the values corresponding to the sum of the bit rates of the small contributors and the sum of the bit rates of the large contributors are mutually consistent since it is the threshold that determines whether a contributor is small or large. The variable time period for computing the threshold can vary up to a maximum value. On approaching that maximum value, the threshold is recomputed less frequently.

Accordingly, if the sum of the bit rates of the small contributors is far from the target bit rate for the service, typically greater than the target bit rate plus an acceptable margin $\tau$ between the bit rate of data actually sent to the service and the target bit rate or less than the target bit rate minus the acceptable margin $\tau$, the variable time period must be re-evaluated because the bandwidth is not being used optimally: either there are too few authorized contributors, who are therefore considered to be small contributors, and the bandwidth is under-used, or there are too many authorized contributors, and the bandwidth is used to the maximum. In both cases, adjustment of the threshold is required: either to increase the threshold so that contributors until now deemed to be large contributors move into the category of small contributors and are authorized to send traffic to the service, or else to lower the threshold in order to comply with the target bit rate for the service.

In one particular implementation of the invention, if one of the last two successive thresholds is above the threshold and the other below it, the threshold is further limited by the last two successive thresholds.

The method advantageously takes account of the fact that contributors have bit rates that are not dissimilar, or even that are similar. Under such circumstances, oscillations of successive thresholds occur: a second threshold can be lower than a first threshold computed previously and a third threshold computed after the second threshold can be higher than the second threshold, and so on. Thus a contributor deemed to be a small contributor with reference to the first threshold is authorized to send traffic to the service but may be deemed to be a large contributor with reference to the second threshold, and so the traffic will be blocked during the period for which the second threshold applies. Quality of service is then not maintained for this user.

Taking this situation into account enables the computation of the threshold to be refined and avoids a contributor being moved systematically from a category in which the contributor's traffic is accepted to another in which the traffic is blocked because of oscillation of the threshold. Thus contributors whose bit rates lie in a range between the second and first thresholds, which mark the beginning of an oscillation, are accepted as far as possible and in their order of arrival. The decision to accept a contributor is reserved for as long as the threshold oscillates around the bit rate of that contributor or if the threshold increases because of a reduction of the bit rates of the small contributors. Contributors whose limit is below the second threshold, which is the lower limit of the interval, are automatically accepted. The bit rate authorized at the output from a rate limiting module that makes use of the method of the invention is therefore controlled in a highly refined manner.

The method advantageously also provides a solution to involuntary denials of service caused by many contributors accessing a service at the same time, for example simultaneous access to an Internet site, which saturates the resources of a server.

Another aspect of the invention is directed to a device for limiting the bit rate to a network service having a target bit rate ($D^M$), data traffic packet to the service coming from at least one contributor and a bit rate being associated with the portion of the traffic coming from said contributor, said device including means for sending the packet from the contributor to the service if the bit rate of the traffic from the contributor is below a threshold that is a function of the target bit rate and a current data packet traffic to said service, the bit rate of the traffic from the contributor being measured on the current data packet traffic.

In one particular embodiment of the invention the rate-limiting device further includes:
  means for computing the bit rate associated with the portion of the traffic coming from said contributor; and
  means for computing the threshold.

In one particular embodiment of the invention, the rate-limiting device further includes means for evaluating a time for recomputing the threshold, after the threshold has been computed at a first time, and the evaluation means are adapted to supply a second time at which the threshold will be recomputed.

In one particular embodiment of the invention the rate-limiting device further comprises means for limiting the threshold, adapted to limit the threshold by the last two successive thresholds, one of the last two successive thresholds being above the threshold and the other below it.

Another aspect of the invention relates to a network equipment including a device for limiting the bit rate to a network service having a target bit rate ($D^M$), data packet traffic to the service coming from at least one contributor and a bit rate being associated with the traffic portion coming from said contributor. Said device includes means for sending the packet from the contributor to the service if the bit rate of the traffic from the contributor is below a threshold that is a function of the target bit rate and a current data packet traffic to said service, the bit rate of the traffic from the contributor being measured on the current data packet traffic.

Advantageously, a network equipment, for example a router, usually dedicated to routing functions, integrates the method of the invention and, in addition to its usual function, performs a rate limiting function of the invention. Traffic received by the network equipment is therefore processed in accordance with the invention without having to be redirected to other equipments dedicated to traffic limiting. Thus if it is to apply rate limiting, an existing architecture requires certain equipments to be updated; the architecture does not need to be redefined to take new equipments into account specifically for rate limiting.

Another aspect of the invention relates to a computer program on a data medium and loadable into the internal memory of a computer, the program including code portions for executing steps of the method of the invention if the program is executed on said computer.

The method of the invention can be implemented in the form of algorithms used by a program comprising executable code portions. The algorithms advantageously all have temporal complexity such that the processing time per packet is constant (the notation ordinarily employed to designate such complexity is "O(1)"). The algorithms and the method therefore comply with real time constraints. They are applicable regardless of the volume of traffic and are advantageously used for very high bit rate traffic.

Another aspect of the invention provides partially or totally removable data storage means containing computer program code instructions for executing the steps of the above method.

BRIEF DESCRIPTION OF THE DRAWINGS

The appended drawings are provided by way of non-limiting example and in which.

DETAILED DESCRIPTION OF THE DRAWINGS

The expression "network service" encompasses any element of a network with a capacity expressed in terms of bandwidth. Thus network service means a software type service, for example a website, a connection between two network equipments, or a network equipment itself.

A contributor to a network service sends traffic to that service over the network. The contributor is identified by an Internet Protocol (IP) address. In the context of rate limiting, and below, a contributor is qualified as small if that contributor's traffic to the service is authorized. A contributor is qualified as large if the contributor's traffic is blocked.

A current or instantaneous level of traffic going to the service symbolizes the overall traffic, i.e. all traffic from contributors to the service measured at a given time or during a given time period.

Figure 1:
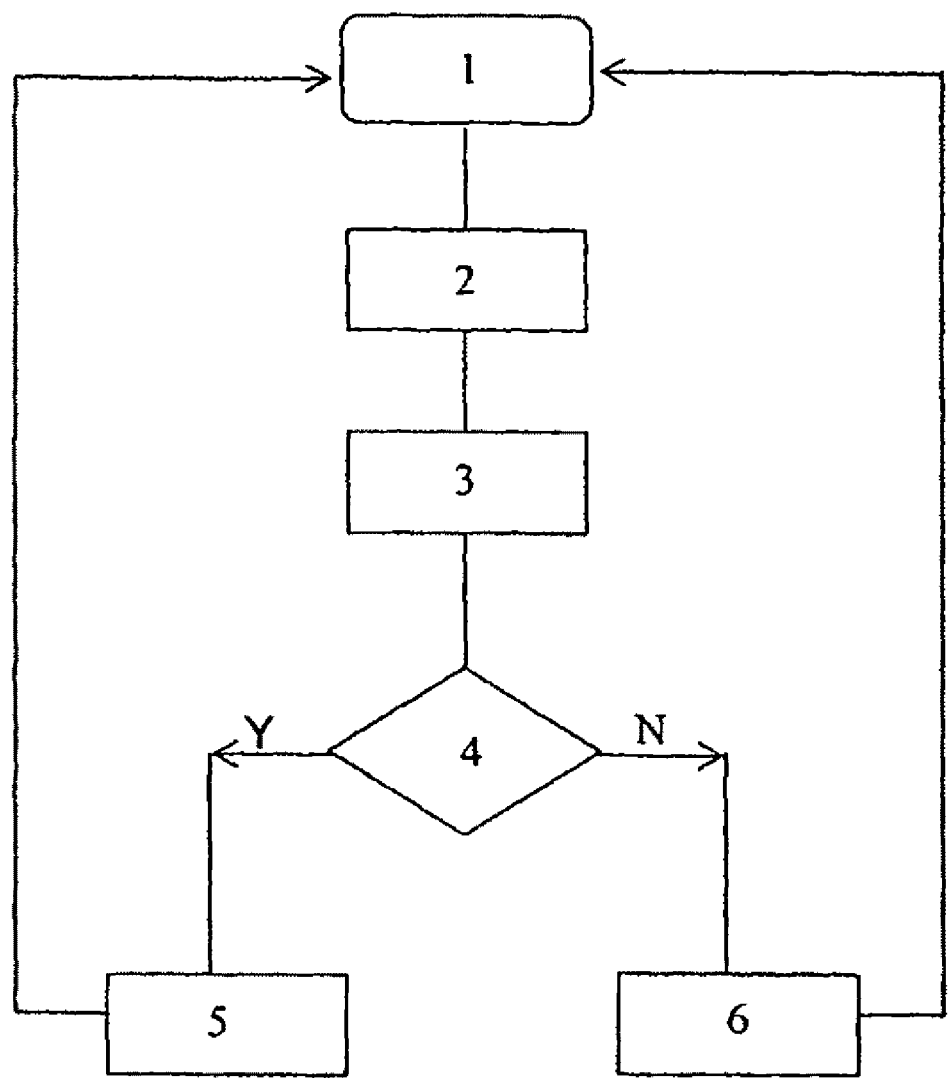
FIG. 1 shows the steps of the method of the invention.

FIG. 1 shows the steps of the rate limiting method of the invention.

In an initial packet reception step 1, a packet is received that is part of data packet traffic sent to a network service.

In a step 2, following reception of the packet in the initial step 1, the current traffic going to the network service is updated to take account of the incoming packet.

In one particular embodiment of the invention, the current traffic is determined by the traffic of the contributors over a given time period, for example over a time window of fixed duration, referred to as a sliding window. Updating the current traffic consists in taking the incoming packet into account in the sliding window and causing packets to leave the sliding window by sliding it. The operation of the sliding window and the sliding thereof upon the arrival of a packet are described with reference to FIGS. 2a and 2b.

In a step 3, following updating of the current traffic in the step 2, the bit rate of the traffic present in the sliding window and associated with the contributor who sent the packet is computed. Thus the bit rate of a contributor is associated with the portion of the current traffic present in the sliding window that comes from said contributor; it is therefore measured on the current data packet traffic.

Figure 3A:
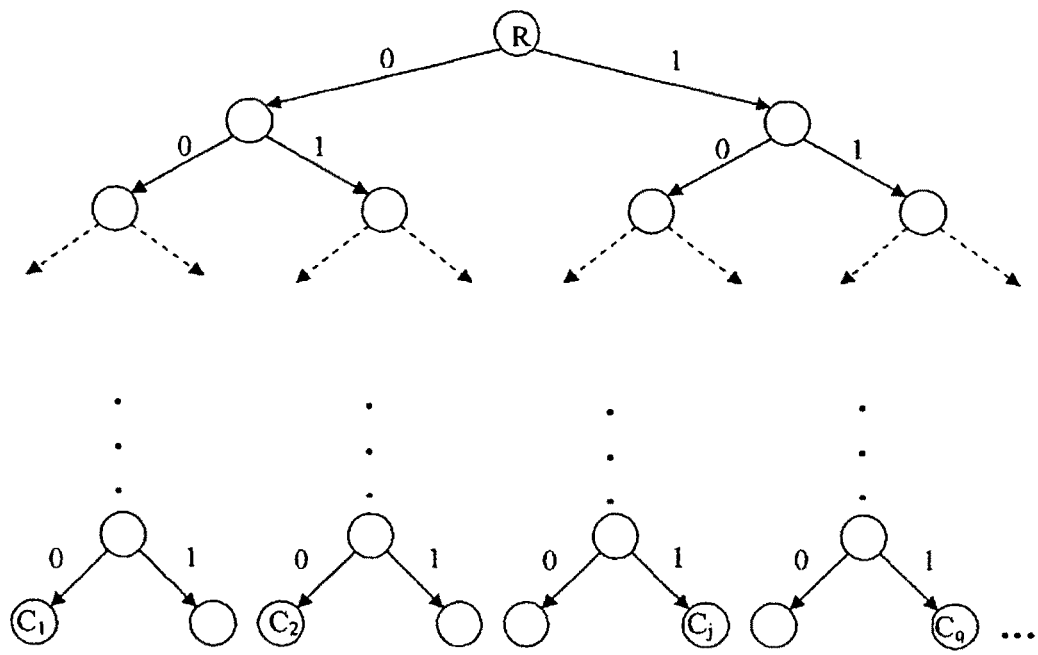
FIG. 3a shows the step of searching for data specific to a contributor and FIG. 3b shows the steps of computing a bit rate associated with the current traffic of a contributor.
Figure 3B:
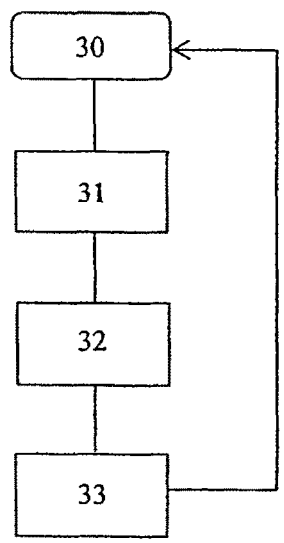

FIGS. 3a and 3b show one particular way of computing the bit rate of a contributor.

At the end of the step 3, the bit rate associated with the contributor who sent the last packet to arrive in the sliding window is available.

In this implementation of the invention, the bit rate is computed on the arrival of the new packet.

In a step 4, following the step 3 of computing the bit rate associated with the contributor who sent the packet and whose traffic constitutes a portion of the current traffic, a test is performed to determine whether the bit rate associated with the contributor is below a threshold $L_n$.

If the result of the test performed in the step 4 is positive, then the packet is authorized to go to the service. In a step 5, the packet is sent to the service. To be more precise, the decision to transmit the packet to the service is associated with said packet. Thus the packet is sent to the service when it leaves the sliding window. At the end of the step 5, the method returns to the initial step 1 of receiving packets.

If the result of the test performed in the step 4 is negative, then the packet is not authorized to go to the service. In a step 6, the packet is blocked. To be more precise, the decision to block the packet is associated with said packet. Thus the packet is blocked when it leaves the sliding window. At the end of the step 6, the method returns to the initial step 1 of receiving packets.

Note that the decision to authorize the packet to go to the service or to reject it is taken when the packet is received.

The threshold $L_n$ is a limit that discriminates between small contributors and large contributors. Below the threshold $L_n$, a contributor is deemed to be small. That contributor's traffic is authorized to go to the service. Above that threshold, the contributor is deemed to be large, and that contributor's traffic is blocked. The limit $L_n$ is a variable limit updated as a function of the observed overall traffic. How it is computed is described with reference to FIG. 4.

In one particular embodiment of the invention, the current traffic is, broadly speaking, the traffic to the observed network service during a given time period called the sliding window.

Figure 2A:
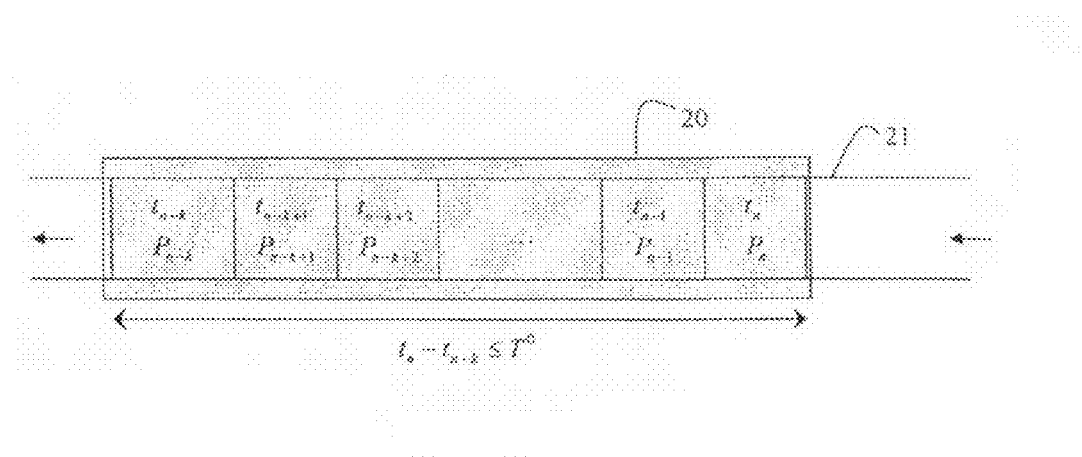
FIGS. 2a and 2b show the use, in the method of the invention, of a sliding time window for packet traffic to a service.
Figure 2B:
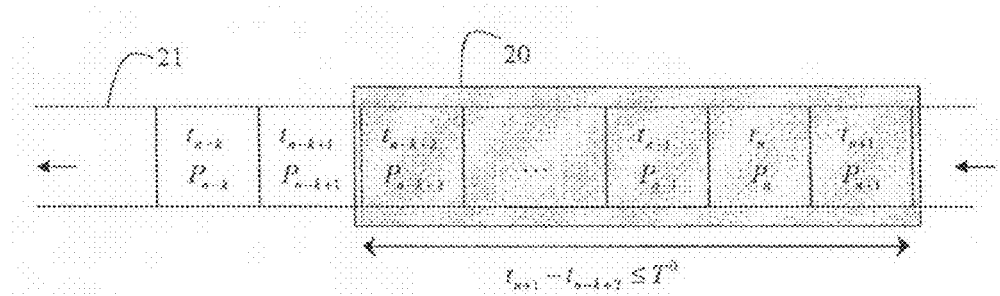

FIGS. 2a and 2b show the use of a sliding window in the method of the invention and the sliding of the window on the arrival of a new packet.

The shaded rectangle represents a sliding window 20. In this particular embodiment of the invention, the sliding window 20 is constant and represents a time range $T^0$. Traffic 21 to the service consists of data packets $P_n$, n>0. The direction of flow of the traffic 21 is represented by the half-arrows: a packet enters via the head of the sliding window, as indicated by the right-hand half-arrow, and leaves via the tail of the window, as indicated by the left-hand half-arrow. Each packet $P_n$ of the traffic to the service is associated with an arrival time $t_n$. Each packet $P_n$ is also associated with characteristics that are not shown, for example an IP address of the source that sent the packet $P_n$. The IP address of the source is data that appears in the header of the packet $P_n$. Since the duration of the sliding window 20 is constant, the sliding window 20 contains packets for which the absolute value of the difference between their arrival time and the arrival time of the most recent packet is less than $T^0$. In FIG. 2a, the sliding window 20 contains packets $P_{n-k}$ to $P_n$.

FIG. 2b shows the sliding of the sliding window 20 on the arrival of a new packet $P_{n+1}$. When the new packet $P_{n+1}$ arrives, the head of the window is shifted so that the new packet $P_{n+1}$ enters it and the tail of the window 20 is moved forward for as long as the difference between the arrival time $t_{n+1}$ of the new packet $P_{n+1}$ and the arrival time of the oldest packet in the sliding window 20 is greater than $T^0$. Thus when the packet $P_{n+1}$ arrives, the packets $P_{n-k}$ and $P_{n-k+1}$ leave the sliding window 20.

The steps of computing a bit rate associated with a contributor $C_j$, the bit rate being computed over the sliding window that constitutes the current traffic determination period, are described for one particular embodiment of the invention, illustrated by FIGS. 3a and 3b. As shown in FIG. 3a, a binary tree with root R is used to store information relating to contributors $C_1$, $C_2$, $C_j$, and $C_q$ who contribute to the overall traffic to the service. The information is stored in a memory that is not shown.

The path through the binary tree depends on the source IP address of the contributor. That address appears in the header of packets going to the service. Conventionally, an IP address of a contributor is of the form x.y.z.w where x, y, z, and w are unsigned integers represented on one byte, and therefore running from 0 to 255. The size of an IP address is therefore fixed at 32 bits. If the most significant bit, i.e. the left-hand bit, of the IP address is 0, then the path through the tree with root R begins at the left-hand child node. If not, it begins at the right-hand child node. Thus from a node of depth k (not shown) in the binary tree, the path continues through the left-hand child node if the $k^{th}$ bit has the value 0 and the right-hand child node otherwise.

A leaf of the tree reached by this path is associated with the contributor who is being searched for. The leaf contains data (not shown) about the contributor. Since the size of the IP addresses is fixed, the time to work through the tree is constant.

FIG. 3b shows the steps of computing a bit rate associated with a contributor. To evaluate the bit rate associated with a contributor $C_j$ for the current traffic, on the arrival of a packet sent by the contributor $C_j$, a volume $V_j$ of the packets of the contributor $C_j$ contained in the sliding window is updated. The binary tree is advantageously used to store and recover data relating to contributors.

In an initial step 30, the packet sent by the contributor $C_j$ arrives in the sliding window. An arrival time t is associated with the packet.

In a step 31, following the initial step 30 of receiving the packet, parameters associated with the contributor $C_j$ are recovered, such as the volume $V_j$ of packets coming from the contributor $C_j$ and present in the sliding window before the arrival of the packet. The size of the packet is added to the volume $V_j$ of packets coming from the contributor $C_j$.

In a step 32 following the step 31, so long as the time t of the packet and the time $t_q$ of an old packet q at the tail of the sliding window is greater than $T^0$:

the contributor $C_q$ who sent the old packet q at the tail of the sliding window is identified;

the size of the old packet q at the tail of the sliding window is subtracted from the volume $V_q$ of packets from the contributor $C_q$ present in the sliding window;

if the value of $V_q$ is 0, the contributor, $C_q$ is removed from the binary tree of contributors;

the sliding window slides as described with reference to FIG. 2a.

In a step 33, following the step 32, the bit rate $D_j$ associated with the contributor $C_j$ who sent the packet is computed over the sliding window from the formula:

$$D_j = \frac{V_j}{T_0}$$

Thus the bit rate $D_j$ associated with the contributor $C_j$ who sent the packet is available before deciding whether to pass or reject the packet.

At the end of the step 33 the method returns to the initial step 30 and waits for a packet.

The binary tree enables said information to be retrieved in a constant time. It therefore facilitates computing the bit rate for an incoming packet.

Figure 4:
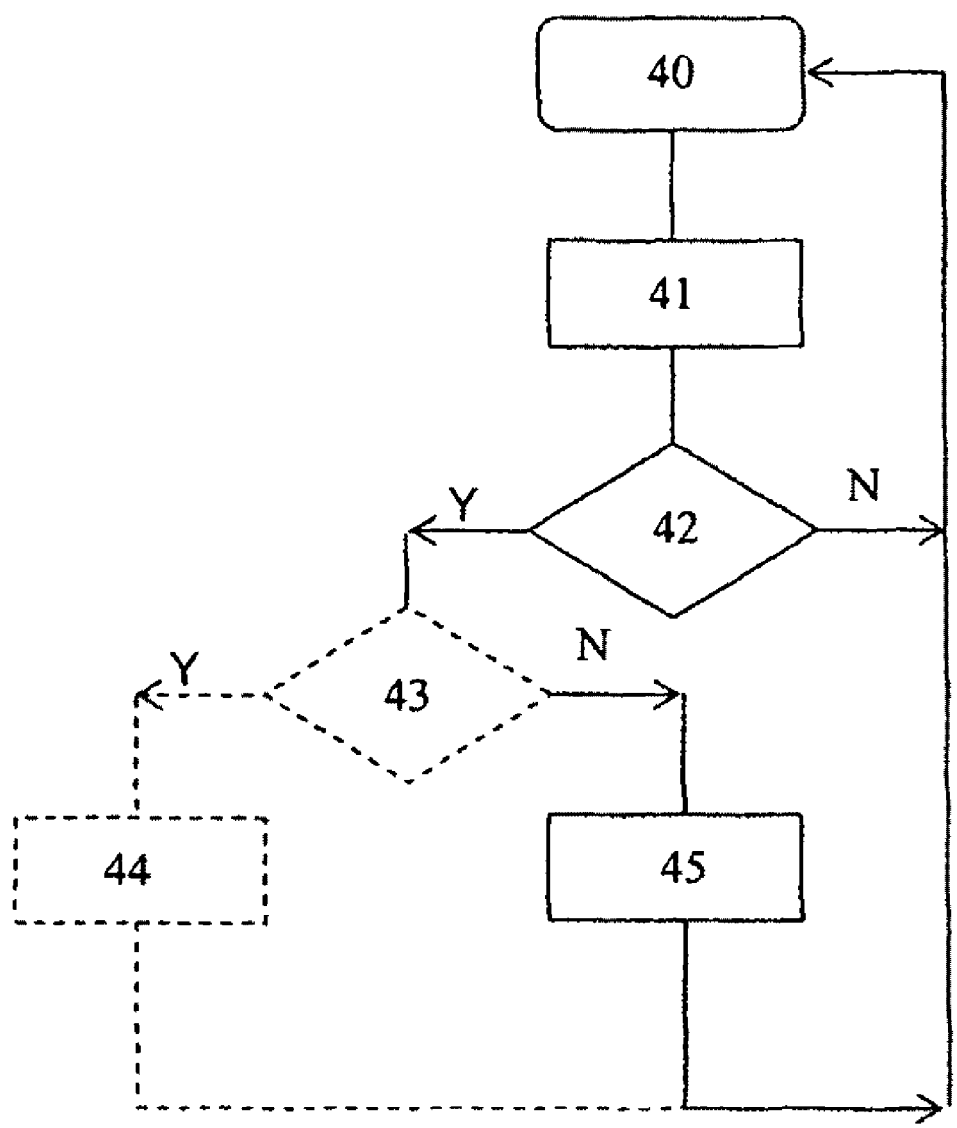
FIG. 4 shows the steps of computing the threshold used by the method of the invention.

FIG. 4 shows the steps of the method of the invention for computing the threshold.

In an initial step 40 of evaluating the threshold, the packet is received. It is assumed in the step 40 that a threshold $L_n$ and a time window size $T^0$ apply. It is also assumed that the threshold $L_n$ is computed at a time $T_n$ prior to the time t of receiving the packet. It is further assumed that successive earlier thresholds $L_{n-1}$, $L_{n-2}$ are computed at times $T_{n-1}$ and $T_{n-2}$ prior to the time $T_n$ and that the threshold $L_n$ is computed after the threshold $L_{n-1}$.

On reception of the packet, and when the packet is taken into account in the sliding window, the data associated with the contributors is updated as in the step 33 in FIG. 3b, and the window slides. The bit rate associated with the contributor who sent the packet is therefore recomputed taking account of the packets leaving the sliding window.

It is verified whether the contributor who sent the packet continues to be identified as a small contributor (or respectively a large contributor as the case may be). For this purpose the bit rate of the contributor is compared to the threshold $L_n$. If the bit rate of the contributor is below (respectively above) the threshold $L_n$, the contributor continues to be identified as a small (respectively large) contributor.

If the contributor continues to be identified as a small (respectively large) contributor, a sum $D^0$ (respectively $D^1$) of the bit rates of the small (respectively large) contributors is updated: the bit rate of the small (respectively large) contributor is added to the sum $D^0$ (respectively $D^1$) of the bit rates of the small (respectively large) contributors. In contrast, if the contributor becomes a large (respectively small) contributor, the bit rate of the contributor is subtracted from the sum $D^0$ of small contributors and added to the sum $D^1$ of large contributors (respectively subtracted from the sum $D^1$ of large contributors and added to the sum $D^0$ of small contributors).

In a step 41, following the initial step 40, a time period $T_R$ at the end of which a new threshold $L_{n+1}$ is to be computed is evaluated. The period $T_R$ begins at the time $T_n$ at which the threshold $L_n$ is computed. Thus the threshold $L_n$, computed at the time $T_n$, is applied to packets that arrive at times after the time $T_n$; it applies until the new threshold $L_{n+1}$ is computed. An example of determining the time period $T_R$ is described with reference to FIG. 5.

A test step 42 verifies whether a new threshold is to be computed, i.e. whether the time period $T_R$ since the computation of the threshold $L_n$ has expired or not, i.e. whether $t - T_n \geq T_R$.

If the result of the test performed in the step 42 is negative, then, since there is no need to recompute the threshold, the method returns to the initial step 40 of evaluating the threshold, and waits for a packet.

If the result of the test performed in the step 42 is positive, then is it verified whether the threshold is oscillating, in an optional oscillation detection step 43.

For this purpose, and having access to the two successive thresholds preceding the last threshold $L_n$ to be computed, it is determined whether the sum of the bit rates of the small contributors now exceeds the target bit rate $D^M$ for the service while the earlier thresholds were applicable.

In one particular implementation of the invention, indicator flags $I_{n-2}^D$ and $I_{n-1}^D$, evaluated at times $T_{n-1}$ and $T_n$, indicate whether or not the limits $L_{n-2}$ and $L_{n-1}$ caused the output bit rate $D^M$ to the service to be exceeded.

Thus if the limit $L_{n-2}$ computed at time $T_{n-2}$ led to the sum $D^0$ of the bit rates of the small contributors exceeding the target bit rate $D^M$, then $I_{n-1}^D$ is set to 1. In contrast, if the limit $L_{n-1}$ computed at time $T_{n-1}$ did not cause the sum $D^0$ of the bit rates of the small contributors to exceed the target bit rate $D^M$, then $I_{n-1}^D$ is set to 0.

If $I_{n-1}^D$ and $I_{n-2}^D$ are different, then the threshold is oscillating.

Let $L_{min}$ and $L_{max}$ respectively denote the minimum and maximum values of the last two thresholds:

$$L_{min} = \min(L_{n-2}, L_{n-1});$$

$$L_{max} = \max(L_{n-2}, L_{n-1}).$$

If the result of the test performed in the optional step 43 of detecting oscillations is positive, then the new threshold $L_{n+1}$ is computed at the time $T_{n+1}$, a constraint being added to the new threshold. The latter is bounded by the range $[L_{min}, L_{max}]$.

Thus $L_{n+1}$ is computed from the following formula:

$$L_{n+1} = L_{max} \text{ if } \sqrt{\frac{D^M}{D^0}} L_n \geq L_{max}$$

$$L_{n+1} = L_{min} \text{ if } \sqrt{\frac{D^M}{D^0}} L_n \leq L_{min}$$

$$\text{else } L_{n+1} = \sqrt{\frac{D^M}{D^0}} L_n$$

If the result of the test performed in the optional oscillation detection step 43 is negative, or if the optional step is not carried out and the result of the test performed in the step 42 is positive, then, in a step 46, the new threshold $L_{n+1}$ is computed at the time $T_{n+1}$, as follows:

$$L_{n+1} = \begin{cases} \sqrt{\frac{D^M}{D^0}} L_n \\ L_{n-1} \text{ if } D^0 = 0 \end{cases}$$

If it is assumed that the distribution of the number of contributors is uniform and has the value $\rho$, then $L_n$ and $D^0$ satisfy the following equation, in which r represents a bit rate:

$$D^0 = \int_0^{L_n} \rho r \, dr = \rho \frac{L_n^2}{2} \tag{1}$$

In the same way, an estimate of $L_{n+1}$ can be obtained from the equation:

$$D^M = \int_0^{L_{n+1}} \rho r \, dr = \rho \frac{L_{n+1}^2}{2} \tag{2}$$

Equations (1) and (2) therefore yield an estimate of $L_{n+1}$ satisfying the equation:

$$L_{n+1} = \sqrt{\frac{D^M}{D^0}} L_n$$

However, the threshold $L_n$ may be such that the sum $D^0$ of the bit rates of the small contributors is zero. Under such conditions, a pertinent choice is to take $L_{n-1}$ as the new threshold.

Figure 5:
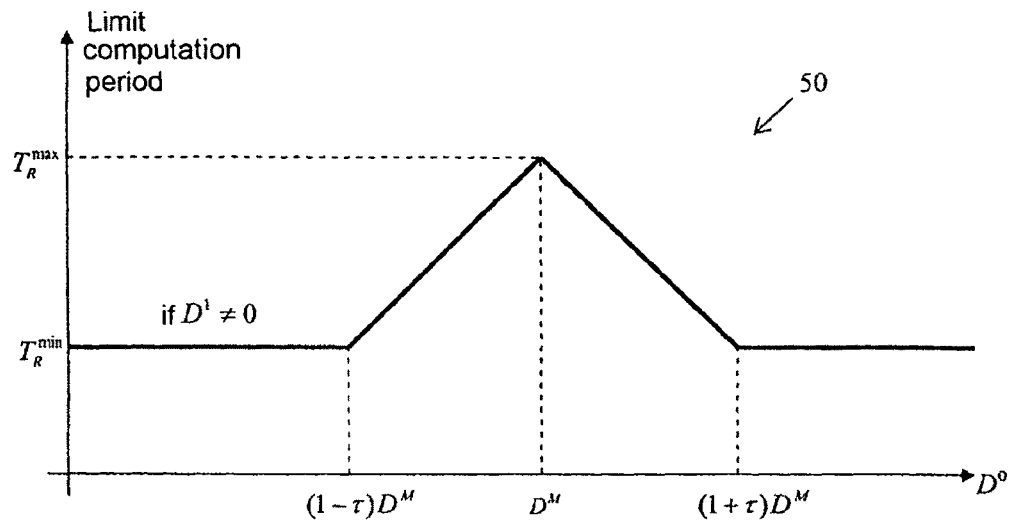
FIG. 5 shows one example of a function for determining the period for computation of the threshold according to the invention.

FIG. 5 shows one example of a function for determining the threshold computation period $T_R$.

The function is represented by a curve 50. The abscissa represents the sum $D^0$ of the bit rates of the small contributors. The ordinate represents the threshold computation period $T_R$. The period $T_R$ is bounded by the values $T_R^{min}$ and $T_R^{max}$.

In an advantageous embodiment of the invention the minimum value $T_R^{min}$ is equal to the time window $T^0$. Thus a new threshold is computed after the packets contained in the window at the time of computing the previous threshold have left the window. The sums of the small and large contributors are therefore mutually consistent and can be used for a new threshold computation.

If the sum $D^0$ of the small contributors is close to the target bit rate $D^M$ for the service, then the period for computing the new threshold $L_{n+1}$ is close to a predetermined maximum value $T_R^{max}$. The error in choosing the threshold that separates the large and small contributors is then small. Here the threshold is the optimum threshold since all the contributors deemed to be small have access to the service and the bandwidth of the service is used optimally.

If the sum of the bit rates of the small contributors is far from the target bit rate $D^M$ for the service, then the period for computing the new threshold $L_{n+1}$ is short, close to a predefined minimum value $T_R^{min}$. The error in choosing the threshold is high since the bandwidth of the service is not used optimally. It is probable that contributors deemed to be large and whose bit rate is only slightly above the threshold $L_n$ could access the service without the overall bit rate exceeding the target bit rate. In one implementation of the invention, $T_R^{min}$ is equal to $T^0$ and is set at 1 second and $T_R^{max}$ is set at 5 seconds.

The sum of the bit rates of the small contributors is typically compared to an interval:

$$[(1-\tau)D^M, (1+\tau)D^M],$$

in which τ represents an acceptable margin between the bit rate of data actually sent to the service and the target bit rate $D^M$. Accordingly, if the sum of the bit rates of the small contributors is far from the target bit rate $D^M$, the period $T_R$ for computing the threshold is close to the boundaries of the interval.

Thus the greater the error between the sum of the bit rates of the authorized small contributors and the target bit rate $D^M$, the more often the threshold is recomputed.

The positioning of the threshold impacts directly on the quantity of traffic authorized to go to the service.

Figure 6:
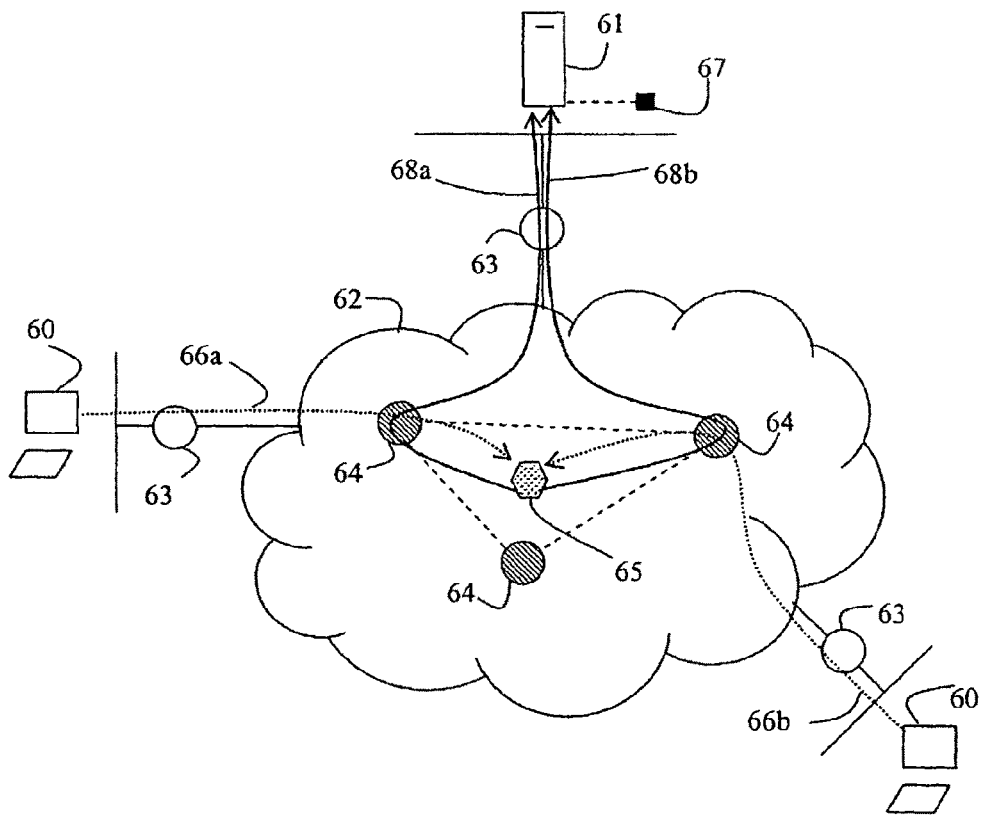
FIG. 6 shows a network architecture that uses the method of the invention.

FIG. 6 shows a network architecture that uses a rate limiting method of the invention.

Users 60 access a network service 61 via a network 62, for example the Internet. The users 60 send traffic 66a, 66b to the service 61 via the network 62. The traffic passes through network equipments, for example edge routers 63 and core network routers 64 and, in normal operation of the service 61 (not shown), the traffic is routed to the service 61 by the router 64 and then the router 63.

A conventional rate limiting method is coupled with a detection method which, on detection of an abnormally high volume of packet traffic, for example attack traffic, re-routes the abnormally high volume of traffic to a network equipment, for example a dedicated server, that implements the conventional rate limiting method.

In the present architecture, a method of detecting high traffic, such as attack traffic, is implemented in a sensor 68 close to the network service 61. On detecting abnormally high traffic, an instruction to reroute traffic to the service 61 is sent to the edge routers 63 so that any traffic to the service 61 is routed to a network equipment 65 that implements the rate limiting method of the invention. The equipment contains a program adapted to be stored in an internal memory that is not shown; the program can be stored on a computer-readable medium or downloaded via a telecommunications network. It includes instructions for executing the rate limiting method of the invention. The network equipment 65 that receives the traffic 66a and 66b from the users 60 uses the method of the invention to block the packets of this traffic or to forward them to the service. The traffic 68a, 68b that is returned to the network by the network equipment 65 and that is forwarded to the service 61 is clean.

In a variant network architecture, the rate limiting method of the invention can be distributed between a plurality of network equipments 65.

In one particular implementation of the invention, the network equipment 65 that executes the method of the invention is a server dedicated to the rate limiting function. In an alternative implementation of the invention, not shown, the network equipment 65 is a core network router, responsible for routing traffic, that additionally incorporates a rate limiting function.

Figure 7:
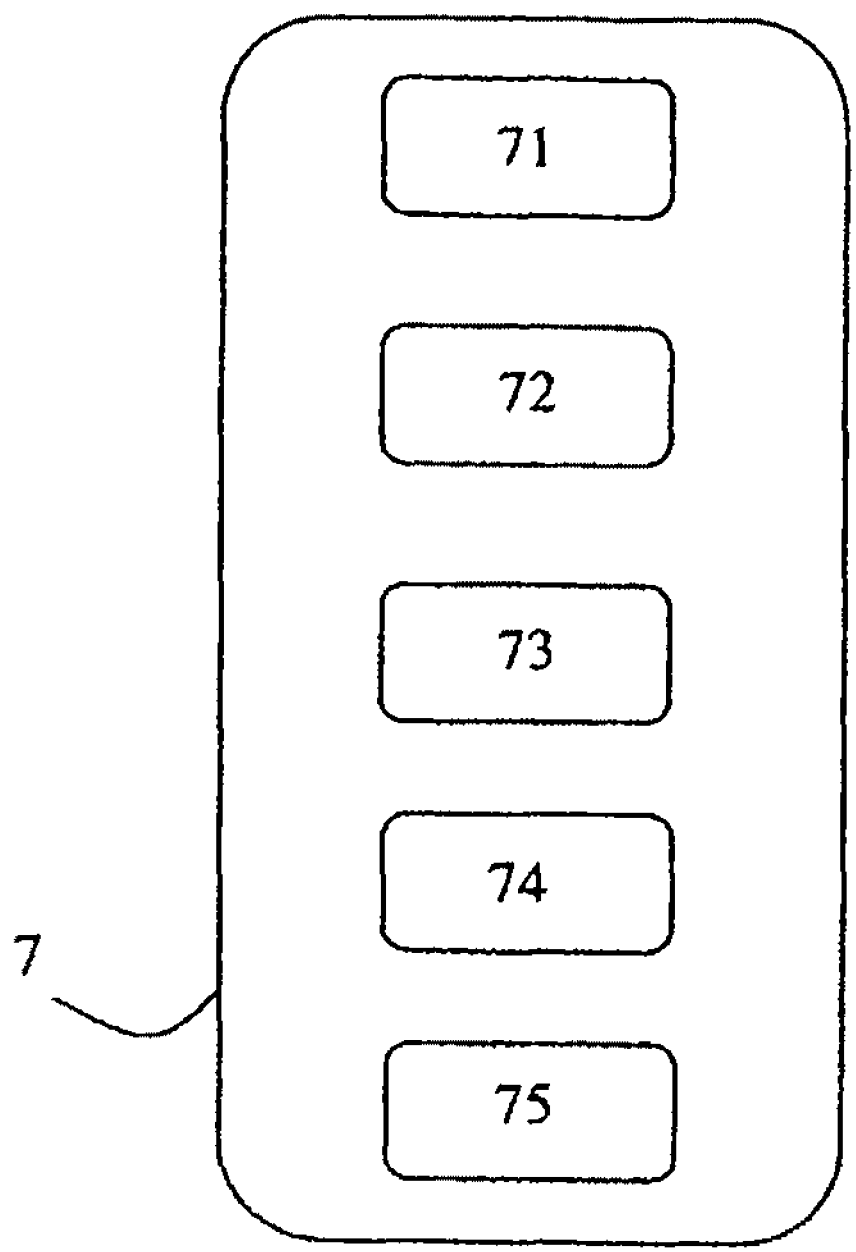
FIG. 7 is a functional representation of a rate limiting module of the invention.

FIG. 7 is a functional representation of one example of a rate-limiting device of the invention.

A rate-limiting device 7 of the invention is adapted to limit the traffic of data packets going to a network service that is not shown. The network service has a target bit rate $D^M$. It is allowed a tolerance margin τ, which is the acceptable margin between the bit rate of data actually sent to the service and the target bit rate $D^M$. The traffic emanates from at least one contributor.

The device 7 comprises the following functional modules:

A transmission module 71 adapted to send a packet from a contributor to the network service if the bit rate of the traffic from the contributor is below a threshold that is a function of the target bit rate of the service and the current data traffic to the service. The bit rate of the traffic from the contributor is measured on the current data packet traffic.

A bit rate computation module 72 adapted to compute the bit rate associated with the portion of the traffic coming from one contributor.

A threshold computation module 73 adapted to compute the threshold that discriminates between large and small contributors, the threshold being a function of the current data packet traffic to the service and the target bit rate $D^M$.

A module 74 for evaluating a threshold recomputation time. The threshold having been computed at a first time, the evaluation module 74 is adapted to supply a second time at which the threshold is to be recomputed.

A module 75 for limiting the active threshold in the event of oscillation of the threshold, intended to limit the threshold by the last two successive thresholds, one of the last two successive thresholds being above the threshold and the other below it.

The modules communicate with one another via a communications bus that is not shown. The rate-limiting device 7 also comprises external interfaces that are not shown, for example for receiving the flow going to the service and forwarding authorized packets to the service.

In one particular embodiment of the invention, the rate-limiting device 7 comprises only the transmission module 71, the other modules being installed in network entities that are not shown and communicate with the module 71 of the device 7.

What is claimed is:

1. A method of limiting a bit rate going to a network service having a target bit rate, wherein data packet traffic to the network service coming from at least one contributor and a bit rate being associated with the portion of the traffic coming from said contributor, wherein the method comprises sending a packet from the contributor to the network service if the bit rate of the traffic of the contributor is below a threshold that is a function of the target bit rate and a current data packet traffic to said network service, the bit rate of the traffic from the contributor being measured on the current data packet traffic,
   wherein, once the threshold has been computed at a first time, a second time at which the threshold is to be recomputed is evaluated on receiving each packet, and
   wherein, with a variable time period for computation of the threshold being defined by the first and second threshold computation times, said variable time period lies in a range from a minimum value for current data packet traffic determination to a predetermined maximum value.

2. A method of limiting a bit rate going to a network service having a target bit rate, wherein data packet traffic to the network service coming from at least one contributor and a bit rate being associated with the portion of the traffic coming from said contributor, wherein the method comprises sending a packet from the contributor to the network service if the bit rate of the traffic of the contributor is below a threshold that is a function of the target bit rate and a current data packet traffic to said network service, the bit rate of the traffic from the contributor being measured on the current data packet traffic, and the method further comprises recalculating the threshold,
   wherein if one of the last two successive thresholds is above the threshold and the other below it, the recalculated threshold is limited by the last two successive thresholds.

3. A device for limiting a bit rate going to a network service having a target bit rate, wherein data packet traffic to the network service coming from at least one contributor and a bit rate being associated with the portion of the traffic coming from said contributor, said device comprising:
- means for sending a packet from the contributor to the network service if the bit rate of the traffic from the contributor is below a threshold that is a function of the target bit rate and a current data packet traffic to said network service, the bit rate of the traffic from the contributor being measured on the current data packet traffic;
- means for computing the bit rate associated with the portion of the traffic coming from said contributor;
- means for computing the threshold;
- means for evaluating a time for recomputing the threshold, after the threshold has been computed at a first time, the evaluation means being adapted to supply a second time at which the threshold is to be recomputed; and
- means for limiting the threshold, adapted to limit the threshold by the last two successive thresholds, one of the last two successive thresholds being above the threshold and the other below it.

4. A method of limiting a bit rate of data packet traffic to a network service having a target bit rate, the data packet traffic to the network service coming from a plurality of contributors, the method comprising:
- for a given contributor associated with a portion of the traffic:
  - determining a bit rate associated with the traffic portion,
  - testing whether the determined bit rate of the traffic portion is below a current threshold, and
  - classifying the contributor as a small contributor and sending a packet from the contributor to the network service if the bit rate of the traffic of the contributor is below the current threshold, and
  - blocking the packet if the bit rate of the traffic of the contributor is above the current threshold; and
- determining a following threshold, wherein the following threshold is a function of the current threshold, the target bit rate and an accumulated current data packet traffic coming from all small contributors.

5. The method according to claim 4, wherein a plurality of following thresholds are determined successively, and the method further comprises detecting oscillation in the successive thresholds, and if oscillation is detected, a next following threshold is limited as a function of the successive thresholds.

6. The method according to claim 4, wherein the bit rate of the traffic from the contributor is measured on the current data packet traffic.

7. The method according to claim 4, further comprising verifying whether a difference between the accumulated current traffic and the target bit rate is greater than a determined value, the step of determining the following threshold being performed if the verification is positive.

8. The method according to claim 4, wherein a variable time period for computation of the threshold is defined by computation times of the current threshold and the following threshold, the variable time period being a minimum value for a current data packet traffic determination that starts at the beginning of a current utilization period.

9. A method according to claim 4, wherein the step of determining the following threshold takes place before a maximum time period.

10. A non-transitory computer-readable medium encoded with a computer program comprising computer-executable instructions to be executed by a computer for executing the steps of a method according to claim 4.

11. A non-transitory computer-readable medium encoded with computer instructions for executing the steps of a method according to claim 4.

12. A device for limiting a bit rate of data packet traffic to a network service having a target bit rate, the data packet traffic to the network service coming from a plurality of contributors, the device comprising:
- means for determining for a given contributor associated with a portion of the traffic, a bit rate associated with the traffic portion;
- means for testing whether the determined bit rate of the traffic portion is below a current threshold;
- means for classifying the contributor as a small contributor and sending a packet from the contributor to the network service if the bit rate of the traffic from the contributor is below a current threshold;
- means for blocking the packet if the bit rate of the traffic from the contributor is above the current threshold; and
- means for determining a following threshold, wherein the following threshold is a function of the current threshold, the target bit rate and an accumulated current data packet traffic coming from all small contributors.

13. The device according to claim 12, further comprising means for evaluating a time for recomputing the threshold, after the threshold has been computed at a first time, the evaluation means being adapted to supply a second time at which the threshold is to be recomputed.

14. The device according to claim 12, further comprising means for limiting the threshold using the last two successive thresholds, wherein one of the last two successive thresholds is above the threshold and the other of the last two successive thresholds is below the threshold.

15. The device according to claim 12, wherein the bit rate of the traffic from the contributor is measured on the current data packet traffic.

16. The device according to claim 12, further comprising:
- means for verifying whether a difference between the accumulated current traffic and the target bit rate is greater than a determined value,
- wherein the means for determining the following threshold performs the determining of the following threshold if a result of the verifying is positive.

17. A network equipment including a device for limiting a bit rate of data packet traffic to a network service having a target bit rate, the data packet traffic to the network service coming from a plurality of contributors, the device comprising:
- means for determining for a given contributor associated with a portion of the traffic, a bit rate associated with the traffic portion;
- means for testing whether the determined bit rate of the traffic portion is below a current threshold;
- means for classifying the contributor as a small contributor and sending a packet from the contributor to the network service if the bit rate of the traffic from the contributor is below a current threshold;
- means for blocking the packet if the bit rate of the traffic from the contributor is above the current threshold; and
- means for determining a following threshold, wherein the following threshold is a function of the current threshold, the target bit rate and an accumulated current data packet traffic coming from all small contributors.

18. The network equipment according to claim 17, wherein the bit rate of the traffic from the contributor is measured on the current data packet traffic.

19. A method of limiting a bit rate of data packet traffic to a network service having a target bit rate, the data packet traffic to the network service coming from a plurality of contributors, the method comprising:

for a given contributor associated with a portion of the traffic:
determining a bit rate associated with the traffic portion,
testing whether the determined bit rate of the traffic portion is below a current threshold, and
classifying the contributor as a small contributor, if the bit rate of the traffic of the contributor is below the current threshold that is a function of a preceding threshold, the target bit rate and an accumulated current data packet traffic to the network service, the bit rate of the traffic from the contributor being measured on the current data packet traffic,
wherein, once the threshold has been computed at a first time, a second time at which the threshold is to be recomputed is evaluated on receiving each data packet, and
wherein a variable time period for computation of the threshold is defined by the first computation time and the second computation time, the variable time period being in a range from a minimum value for a current data packet traffic determination to a predetermined maximum value.

20. A method of limiting a bit rate of data packet traffic to a network service having a target bit rate, the data packet traffic to the network service coming from a plurality of contributors, the method comprising:

for a given contributor associated with a portion of the traffic:
determining a bit rate associated with the traffic portion,
testing whether the determined bit rate of the traffic portion is below a current threshold, and
classifying the contributor as a small contributor, if the bit rate of the traffic of the contributor is below a current threshold that is a function of a preceding threshold, the target bit rate and an accumulated current data packet traffic to the network service, the bit rate of the traffic from the contributor being measured on the current data packet traffic,
wherein the method further comprises recalculating the threshold, and if one of the last two successive thresholds is above the threshold and the other of the last two successive thresholds is below the threshold, the recalculated threshold is limited by the last two successive thresholds.

21. A device for limiting a bit rate of data packet traffic to a network service having a target bit rate, the data packet traffic to the network service coming from a plurality of contributors, the device comprising:

means for determining for a given contributor associated with a portion of the traffic, a bit rate associated with the traffic portion;
means for testing whether the determined bit rate of the traffic portion is below a current threshold;
means for classifying the contributor as a small contributor and sending a packet from the contributor to the network service if the bit rate of the traffic from the contributor is below a current threshold that is a function of a preceding threshold, the target bit rate and an accumulated current data packet traffic to the network service, the bit rate of the traffic from the contributor being measured on the current data packet traffic;
means for computing the threshold;
means for evaluating a time for recomputing the threshold, after the threshold has been computed a first time, the evaluation means being adapted to supply a second time at which the threshold is to be recomputed; and
means for limiting the threshold using the last two successive thresholds, one of the last two successive thresholds being above the threshold and the other of the last two successive thresholds below the threshold.

* * * * *